United States Patent
McGuffin

(10) Patent No.: US 10,425,505 B2
(45) Date of Patent: Sep. 24, 2019

(54) SYSTEM AND METHOD FOR SENDING AND RECEIVING AIR TRAFFIC NETWORK MESSAGES USING DIFFERENT PROTOCOLS

(71) Applicant: Honeywell International Inc., Morris Plains, NJ (US)

(72) Inventor: Thomas F. McGuffin, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 134 days.

(21) Appl. No.: 15/484,051

(22) Filed: Apr. 10, 2017

(65) Prior Publication Data

US 2018/0295218 A1  Oct. 11, 2018

(51) Int. Cl.
 *H04L 29/06* (2006.01)
 *H04B 7/185* (2006.01)
 *G08G 5/00* (2006.01)

(52) U.S. Cl.
 CPC .......... *H04L 69/08* (2013.01); *G08G 5/0013* (2013.01); *G08G 5/0021* (2013.01); *G08G 5/0082* (2013.01); *H04B 7/18506* (2013.01); *H04L 69/26* (2013.01)

(58) Field of Classification Search
 CPC ............ H04B 7/18506; H04B 7/18502; G08G 5/0013; G08G 5/0021; G08G 5/0082; G08G 5/0004; G08G 5/0017; H04L 69/08; H04L 69/26
 USPC ........................................................ 370/316
 See application file for complete search history.

(56) References Cited

U.S. PATENT DOCUMENTS

| | | | |
|---|---|---|---|
| 6,671,728 B1 * | 12/2003 | Mayberry | H04L 29/06 709/202 |
| 7,495,602 B2 | 2/2009 | Sandell et al. | |
| 7,860,642 B2 | 12/2010 | Sandell et al. | |
| 8,244,452 B2 | 8/2012 | Judd et al. | |

(Continued)

FOREIGN PATENT DOCUMENTS

| | | |
|---|---|---|
| EP | 2383714 B1 | 3/2013 |
| WO | 2007064733 A1 | 6/2007 |
| WO | 2007064734 A1 | 6/2007 |

OTHER PUBLICATIONS

European Patent Office, "Extended European Search Report from EP Application No. 18165566.3 dated Sep. 20, 2018", Foreign Counterpart to U.S. Appl. No. 15/484,051, dated Sep. 20, 2018, pp. 1-7.

(Continued)

*Primary Examiner* — Rownak Islam
(74) *Attorney, Agent, or Firm* — Fogg & Powers LLC

(57) ABSTRACT

In one embodiment, a method is provided. The method comprises: receiving a selection of at least one of: an initial air traffic control (ATC) message communications protocol and an initial controller-pilot data link communications (CPDLC) system; determining if a second communications protocol was selected; if the second communications protocol was selected, trapping at least one of a received ATC message in a first communications protocol, and a to be sent ATC message in the first communications protocol; and at least one of sending an ATC message in the selected communications protocol and receiving an ATC message in the selected communications protocol.

18 Claims, 3 Drawing Sheets

(56) References Cited

U.S. PATENT DOCUMENTS

| | | | |
|---|---|---|---|
| 2009/0052370 A1* | 2/2009 | Leclercq | H04B 7/18508 370/316 |
| 2009/0322587 A1* | 12/2009 | Stayton | G01S 7/003 342/37 |
| 2012/0078494 A1* | 3/2012 | Judd | G08G 5/0021 701/120 |
| 2013/0033387 A1* | 2/2013 | Trope | G01O 23/00 340/971 |
| 2013/0090786 A1 | 4/2013 | Judd et al. | |
| 2014/0101337 A1* | 4/2014 | Toth | H04L 67/12 709/244 |
| 2014/0229093 A1 | 8/2014 | Judy et al. | |
| 2017/0054490 A1* | 2/2017 | Zeng | H04B 7/18506 |
| 2017/0212604 A1* | 7/2017 | Bragason | G06F 3/0219 |
| 2018/0145913 A1* | 5/2018 | Nicol | H04L 47/122 |

OTHER PUBLICATIONS

European Patent Office, "Communication pursuant to Article 94(3) from EP Application No. 18165566.3 dated Mar. 21, 2019", from Foreign Counterpart to U.S. Appl. No. 15/484,051, pp. 1-5, Published: EP.

* cited by examiner

SYSTEM AND METHOD FOR SENDING AND RECEIVING AIR TRAFFIC NETWORK MESSAGES USING DIFFERENT PROTOCOLS

BACKGROUND

Data link communications systems are used to facilitate data communications between pilot, aircraft, and air traffic control centers (ATCs) and airline operations centers (AiOCs). Communications between an aircraft and an air traffic control center may include ATC messages, e.g. requests and clearances for changes to flight paths, and aircraft status reports. Communications between aircraft and airline operations centers may include aeronautical operational control (AOC) messages (e.g. about weather updates, flight plans, weight and balance data, etc.) and airline administrative control (AAC) messages (e.g. including departure and arrival data such as out of gate, off the ground, on the ground, and into the gate times). Controller-Pilot data link communications (CPDLC) systems facilitate communications between pilots and air traffic control centers to more efficiently manage an increasing density of aircraft, e.g. in the U.S. and European airspace.

There are two versions of controller-pilot data link communications systems for ATC messaging used in the world today. The two version of CPDLC provide similar functionality but use different communications protocols which are not interoperable. In the U.S., Future Air Navigation System 1/A (FANS 1/A) CPDLC is a standard controller-pilot data link communications system. FANS 1/A CPDLC employs aircraft communications addressing and reporting system (ACARS) protocol to send and receive messages. The ACARS protocol originated from a Telex format and is a character oriented protocol. FANS 1/A typically employs the ACARS protocol over an aviation VHF link control (AVLC or AOA) which sends and receives ACARS protocol messages, between an aircraft and ATC or AOC, on VHF data link mode 2 (VDL-Mode 2) at a data rate of 31.5 kbps. Alternatively, FANS 1/A can also employ Plain Old ACARS by sending and receiving ACARS protocol messages using a lower data rate, 2.4 kbps, VHF data link. In another alternative, FANS 1/A is capable of sending and receiving ACARS protocol messages, e.g. between an aircraft, and an ATC and/or AOC, over HF or SATCOM data links.

In Europe, a different system, Protected Mode-CPDLC (PM-CPDLC) is used to communicate data messages between an aircraft and an ATC. PM-CPDLC employs an Aeronautical Telecommunications Networks/OSI, or ATN/OSI, protocol to send and receive messages. PM-CPDLC messages are also sent and received using VDL-Mode 2. PM-CPDLC utilizes the ATN/OSI protocol on VDL-Mode 2. However, because FANS 1/A CPDLC uses the ACARS protocol and PM-CPDLC uses the ATN/OSI protocol, the two systems are incompatible.

Most aircraft have avionics equipment that implements one version of CPDLC. For example, aircraft of U.S. operators typically have equipment that implements FANS 1/A CPDLC; aircraft of European operators typically have equipment that implements the PM-CPDLC system. Thus, when an aircraft of a U.S. operator departs U.S. air space and enters European airspace, the pilots must rely on less efficient voice communications to communicate with the local air traffic control center.

Aircraft operators are either unable to upgrade avionics on some of their aircraft to support both versions of CPDLC and to permit graceful transition between CPDLC ATC messaging systems, or are reluctant to perform such an upgrade when available because of the cost. Therefore, there is a need for a less costly system that can be retrofitted to these older aircraft that would permits pilots to transition between the two versions of CPDLC systems.

SUMMARY

In one embodiment, a method is provided. The method comprises: receiving a selection of at least one of: an initial air traffic control (ATC) message communications protocol and an initial controller-pilot data link communications (CPDLC) system; determining if a second communications protocol was selected; if the second communications protocol was selected, trapping at least one of a received ATC message in a first communications protocol, and a to be sent ATC message in the first communications protocol; and at least one of sending an ATC message in the selected communications protocol and receiving an ATC message in the selected communications protocol.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding background and summary, or the following detailed description.

Figure 1A:
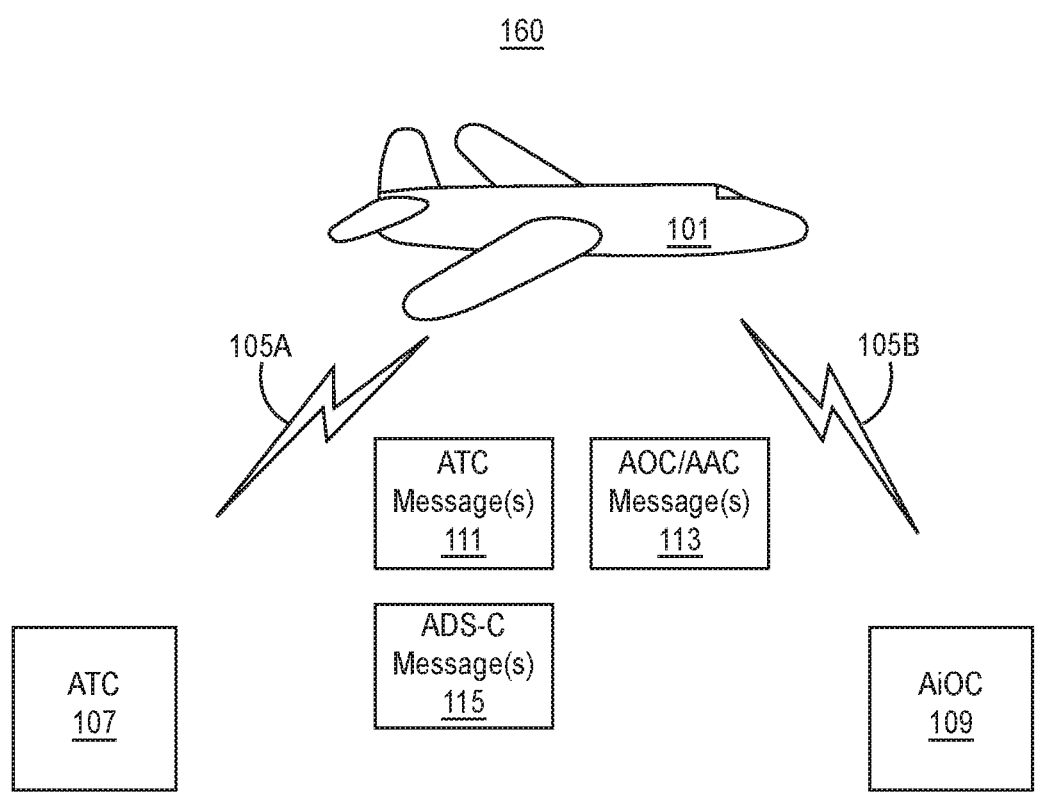
FIG. 1A illustrates one embodiment of a system with an aircraft including a communications protocol control application system.

FIG. 1A illustrates one embodiment of a system 160 with an aircraft 101 including a communications protocol control application system. The system 160 includes the aircraft 101 including the communications protocol control application system, an air traffic control center (ATC) 107, and an airlines operation center (AiOC) 109. The aircraft 101 including the communications protocol control application system is coupled to the ATC 107 and the AiOC 109 respectively by a first communications link 105A and a second communications link 105B. In another embodiment, the first communications link 105A and second communications link 105B use the same communications protocol, e.g. ACARS. In a further embodiment, the first communications link 105A and the second communications link 105B use different communications protocols, e.g. respectively ATN/OSI and ACARS. In one embodiment, each of the first communications link 105A and the second communications link 105B are one or more of a HF, VHF, satellite, AeroMACs communications link and/or any communications links approved for aeronautical message communications. In another embodiment, at least one ATC message 111 is communicated between the aircraft 101 and the ATC 107. In a further embodiment, at least one automatic dependent surveillance-contract (ADC-C) message 115 is communicated between the aircraft 101 and the ATC 107. In yet another embodiment, at least one aeronautical operational control (AOC) messages and airline administrative control (AAC) message (AOC/AAC message) 113 is communicated between the aircraft 101 and the AiOC 109.

Figure 1B:
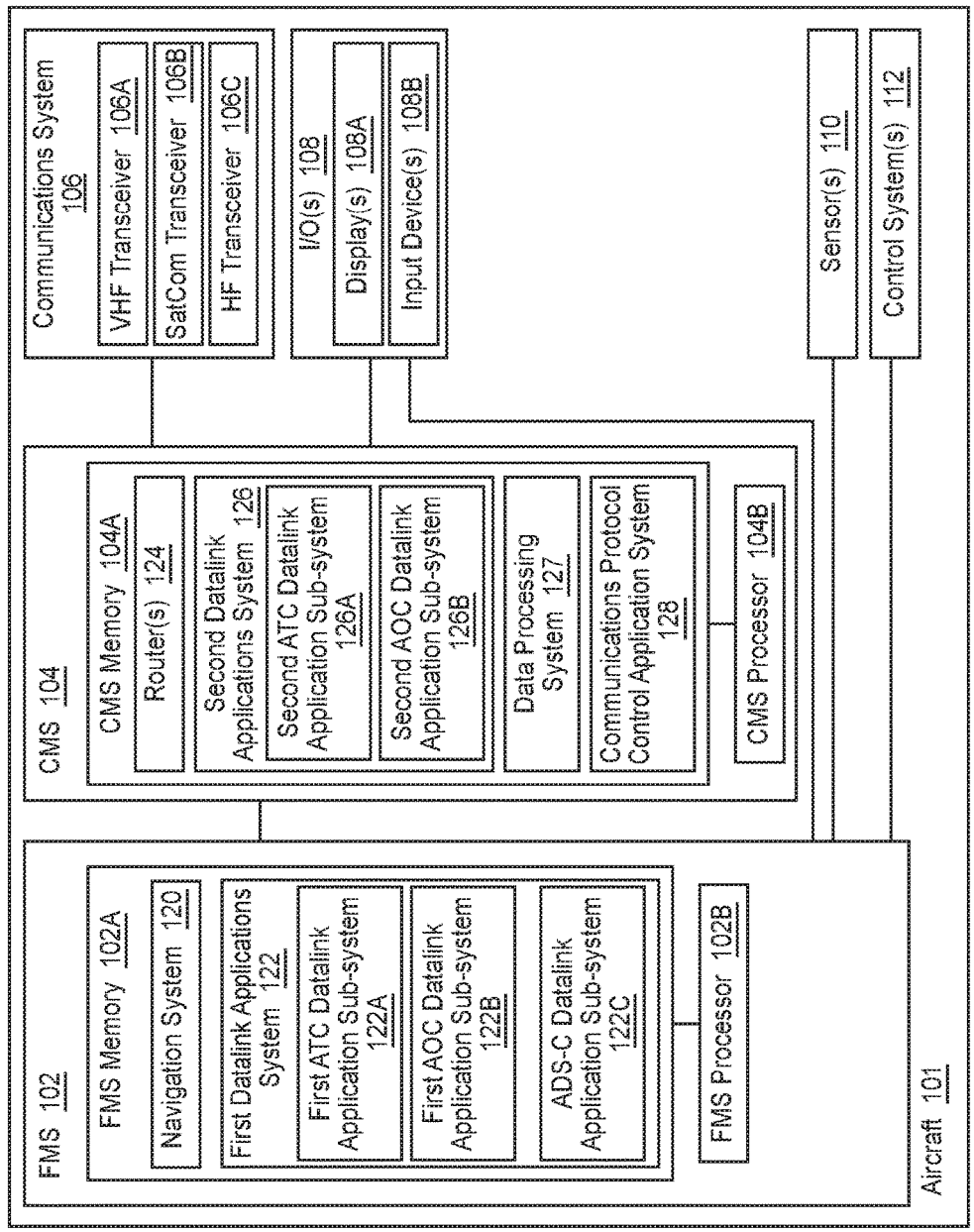
FIG. 1B illustrates one embodiment of an aircraft including a communications protocol control application system.

FIG. 1B illustrates one embodiment of an aircraft 101 including a communications protocol control application system 128. The aircraft 101 further includes a flight management system (FMS) 102, a communications management system (CMS) 104, a communications system 106, at least one input/output device (I/O) 108, at least one sensor 110, and at least one control system 112. In one embodiment, the flight management system 102 is coupled to the communications management system 104, the at least one I/O 108, the at least one sensor 110, and the at least one control system 112. In another embodiment, the flight management system 102 hosts applications (or application systems or sub-systems) as will be further described below.

In one embodiment, the communications management system 104 is coupled to the communications system 106 and the at least one I/O 108. In another embodiment, the communications management system 104 hosts applications (or applications systems or subsystems) as will be subsequently described. The communications management system 104 is commonly known as a communications management unit or CMU.

The communications system 106 includes one or more transceivers, including for HF, VHF, microwave, satellite, AeroMACs, and any other current or future voice and/or data communications, e.g. L-band Digital Aeronautical Communications System (LDACS). FIG. 1B illustrates one embodiment of a communications system 106 having a VHF transceiver 106A, a satellite communications (SatCom) transceiver 106B, and a HF transceiver 106C. In one embodiment, the VHF transceiver 106A includes a VHF data link mode 2 (VDL-Mode 2) mode. In another embodiment, the communications system 106 includes the requisite antenna(s) for the one or more transceivers.

The at least one I/O 108 includes at least one display 108A and/or at least one input device 108B. In one embodiment, the at least one display 108A is at least one multi-function display and/or at least one touchscreen display. In another embodiment, the at least one input device 108B is at least one cursor control device and/or at least one keyboard. In a further embodiment, messages are entered and displayed with the at least one I/O 108.

In one embodiment, the at least one sensor 110 includes at least one global navigation satellite system (GNSS), e.g. GPS, receiver, at least one pitot tube, and/or at least one barometric and/or radar altimeter. The at least one GNSS receiver can be used to determine three-dimensional location and vector velocity (and a corresponding time) of the aircraft 101. The at least one pitot tube can be used to determine speed of the aircraft 101. The at least one barometric and/or radar altimeter can be used to determine altitude of the aircraft 101. In another embodiment, the at least one sensor 110 includes sensors that detect engagement and disengagement of the parking brake of the aircraft 101, and the opening and closing of a door of the aircraft 101. The at least one control system 112 includes surface controls, such as ailerons, elevators and rudders, each of their corresponding actuators, engines, and systems for controlling them, e.g. an autopilot.

The flight management system 102 is primarily used to provide in-flight management of the aircraft's flight plan during transit. Using information from the at least one sensor 112, the flight management system 102 determines the aircraft's position and guides the aircraft along the flight plan. The flight management system provides such information to the crew of the aircraft through the at least one I/O 108A. Additionally, the flight management system 102 (through a FANS 1/A application) facilitates creation, sending, receipt and display of messages using the ACARS protocol.

In one embodiment, the flight management system 102 comprises a FMS memory 102A coupled to a FMS processor 102B. In another embodiment, all or part of the FMS memory 102A and the FMS processor 102B may be implemented by a state machine or a field programmable gate array.

The FMS memory 102A includes a navigation system 120 and first datalink applications system 122. The navigation system 120 is executed by the FMS processor 102, and facilitates determination of aircraft position and implementation of the flight plan.

In one embodiment, the first datalink applications system 122 includes a first ATC datalink application sub-system 122A that performs CPDLC messaging and a first AOC datalink application sub-system 122B that performs AOC and/or AAC messaging. In another embodiment, the first datalink applications system 122 includes an ADS-C datalink application sub-system 122C that performs ADC-C messaging. In a further embodiment, the first ATC datalink application sub-system 122A and the ADS-C applications datalink sub-system 122C are part of a FANS 1/A system.

In one embodiment, the first ATC datalink application sub-system 122A is configured to generate (including to encode) and decode at least one ATC message 111 using a first communications protocol to be sent to or received from an ATC. The first AOC datalink application sub-system 122B facilitates communications between the aircraft 101 and the AiOC 109. In one embodiment, the first AOC datalink application sub-system 122B is configured to generate (including to encode) and decode, using a first communications protocol, at least one at least one AOC/AAC message 113 such as messaging between the aircraft 101 and the AiOC 109, and notification of an aircraft's departure from gate, arrival to gate, takeoff and landing, e.g. triggered by door and parking brake sensors. In another embodiment, the first communications protocol is ACARS. In yet another embodiment, the first datalink applications system 122 directs decoded messages to the at least one I/O 108 for display. In yet a further embodiment, the first datalink applications system 122 directs encoded messages to the communications management system 104 for routing and transmission to ground locations such as the ATC 107 and the AiOC 109.

In one embodiment, ADS-C applications datalink sub-system 122C so generates and decodes at least one ADS-C message 115, e.g. which periodically provides to the ATC 107 an aircraft identifier, 3-D position, a time stamp, and an indication of navigation figure of merit or accuracy. The at least one ADS-C message 115 sent from the aircraft 101 to the ATC 107 may also include ground speed, air speed, heading, vertical rate, next waypoint, and meteorological information.

The communications management system (CMS) 104 is configured to facilitate two-way air-ground datalink communications. The communications management system 104 is configured to route datalink communications, e.g. ATC messages 111, AOC/AAC messages 113, and ADS-C messages 115, between, e.g., the FMS 102, CMS 104, and/or other aircraft systems, and endpoints, such as the ATC 107 and/or AiOC 109. The communications management system 104 routes datalink communications, such as messages, to and from one or more transceivers in the communications system 106 that form part of a communications link between the datalink application subsystems, in the FMS or CMS, and the ATC 107 and/or AiOC 109 on the ground. In one embodiment, the routing function is performed for two or more air-ground datalink message protocols such as ACARS, Aeronautical Telecommunications Networks (ATN)/Open Systems Interconnection (OSI), and ATN/Internet Protocol (IP). In another embodiment, the communications management system 104 is configured to:

a. encrypt and decrypt certain types of messages;
b. compress and decompress certain types of message; and/or
c. generate and add cyclic redundancy check (CRC) codes to certain type of messages, and analyze CRC codes associated with certain types of messages for data integrity verification.

In one embodiment, the communications management system 104 comprises a CMS memory 104A coupled to a CMS processor 104B. In another embodiment, all or part of the CMS memory 104A and the CMS processor 104B may be implemented by a state machine or a field programmable gate array.

In one embodiment, the CMS memory 104A comprises at least one router 124, e.g. for ACARS and ATN protocol messages, a second datalink applications system 126, a data processing system 128, and/or a communications protocol control application system 128. The at least one router 124, second datalink applications system 126, data processing system 127 and/or communications protocol control application system 128 are executed on the CMS processor 104B.

Each of the at least one router 124 is configured to relay and route messages, e.g. at the frame and packet level respectively for ACARS, ATN/OSI and ATN/IP, between the FMS 102, CMU 104 or other aircraft systems and end points, such as the ATC 107 and AiOC 109, in communications with a transceiver in the communications system 106. In one embodiment, the at least one router 124 includes separate routers for different protocols, such as ACARS and ATN/OSI. In another embodiment, if the ATN/IP is used, the at least one router 124 would include an IP router. In a further embodiment, the relay and routing functionality of each of the at least one router 124 is accomplished by a routing table or policy within the corresponding router. In yet another embodiment, a single router may be used to route messages of two or more protocols.

In one embodiment, the second datalink applications system 126 includes a second ATC datalink application sub-system 126A that performs CPDLC messaging and a second AOC datalink application sub-system 126B that performs AOC and/or AAC messaging.

In one embodiment, the second ATC datalink application sub-system 126A is configured to generate (including to encode) and decode at least one ATC message 111 using a second communications protocol to be sent to or received from an ATC. In another embodiment, the second communications protocol is ATN/OSI, or alternatively ATN/Internet Protocol (IP). In a further embodiment, the second communications protocol system 122 is part of a protected mode CPDLC system. The data processing system 127 is configured to perform at least one of encryption and decryption, compression and decompression, and data verification coding or decoding and analysis as further described above.

The second AOC datalink application sub-system 122B facilitates communications between the aircraft 101 and the AiOC 109. In one embodiment, the second AOC datalink application sub-system 126B is configured to generate (including to encode) and decode, using a first communications protocol, at least one at least one AOC/AAC message 113 such as messaging between the aircraft 101 and the AiOC 109, and notification of an aircraft's departure from gate, arrival to gate, takeoff and landing, e.g. triggered by door and parking brake sensors. In another embodiment, the first communications protocol is ACARS. In yet another embodiment, the second datalink applications system 126 directs decoded messages to the at least one I/O 108 for display. In yet a further embodiment, the second datalink applications system 126 directs encoded messages to at least one router 124 for routing and transmission to ground locations such as the ATC 107 and the AiOC 109.

In one embodiment, the first ATC datalink application sub-system 122A, the second AOC datalink application sub-system 122B, and the second AOC datalink application sub-system 126B generate ATC messages 111, and/or AOC/AAC messages 113 in a first ACARS communications protocol that is suitable for transmission between or within avionics such as the FMS 102 and the CMS 104. Such messages are then subsequently converted to a second ACARS communications protocol within the CMS 104 prior to be transmitted by the communications system 106 to the ATC 107 and/or the AiOC 109. Similarly, ATC messages 111 and/or AOC/AAC messages 113 received by the communications system 106 will be in the second ACARS communications protocol. Such messages are subsequently converted to a first ACARS communications protocol within the CMS 104 prior to being routed to the first ATC datalink application sub-system 122A, the second AOC datalink application sub-system 122B, and/or the second AOC datalink application sub-system 126B in the FMS 102 and the CMS 104.

In one embodiment, the communications protocol control application system 128 is configured to select a datalink applications system, and thus a corresponding CPDLC communications protocol. In another embodiment, the selection of CPDLC communications protocol corresponds to a selection of a CPDLC system.

In one embodiment, the communications protocol control application system 128 automatically selects a CPDLC communications protocol, e.g. a CPDLC system, e.g. FANS 1/A or Protected Mode CPDLC. In another embodiment, the communications protocol control application system 128 has a single default CPDLC communications protocol and/or CPDLC system stored in it, which is selected when the communications protocol control application system 128 is activated. In a further embodiment, CPDLC communications protocols and/or systems for different geographical regions are stored, e.g. in the communications protocol control application system 128. Then, by determining the location of the aircraft 101, e.g. from the flight management system 102, the communications protocol control application system 128 can determine which CPDLC system and protocol to use. In yet another embodiment, a user, e.g. a pilot, can select with the at least one I/Os 108 which CPDLC communications protocol and/or system to use. In yet a further embodiment, at or before the commencement of travel of the aircraft 101, the communications protocol control application system 128 prompts the user, with the at least one I/Os 108, to select an initial CPDLC communications protocol and/or system to use. Again, the user would select such a mode with the at least one I/Os 108.

Figure 2:
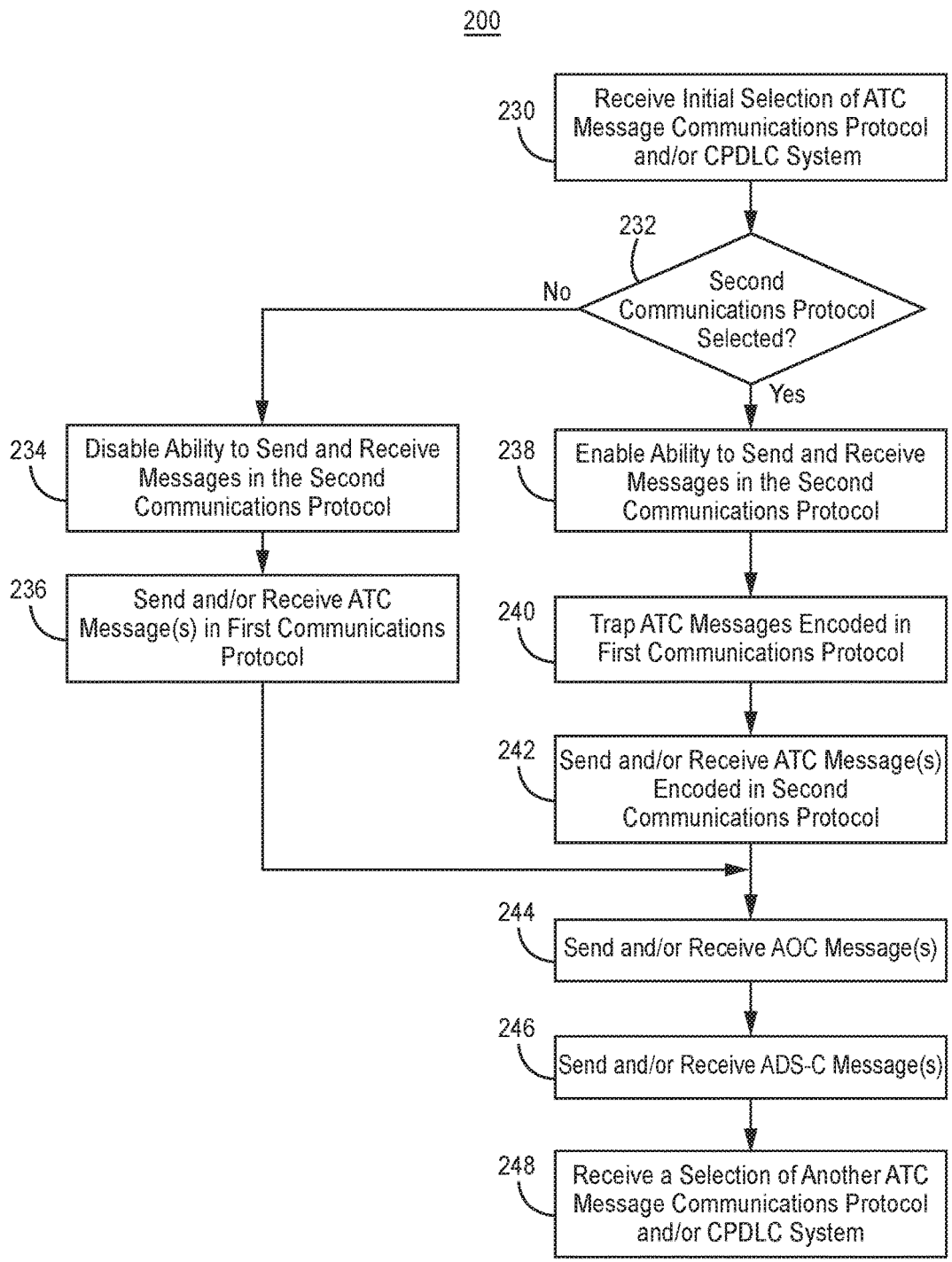
FIG. 2 illustrates one embodiment of a method for sending and receiving air traffic control messages using different protocols.

FIG. 2 illustrates one embodiment of a method 200 for sending and receiving air traffic control messages using different protocols. To the extent that the embodiment of method 200 shown in FIG. 2 is described herein as being implemented in the systems shown in FIG. 1, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

In one embodiment, in block 230, receive a selection of an initial ATC message communications protocol and/or CPDLC system. In another embodiment, selection of a first communications protocol corresponds to selection of a first CPDLC system; selection of a second communications protocol corresponds to selection of a second CPDLC system. Thus, for example, selection of the ACARS protocol corresponds to a selection of the first datalink applications system 122, and e.g. the FANS 1/A system. ACARS messages would be encoded and decoded by the first ATC datalink application sub-system 122A. Further, for example, selection of the ATN/OSI protocol corresponds to a selection of the second datalink applications system 126, and e.g. the PM-CPDLC system. ATN/OSI messages would be encoded and decoded by the second ATC datalink application sub-system 126.

In one embodiment, a user, e.g. a pilot, selects the initial ATC message communications protocol and/or CPDLC system, for example with the at least one I/Os 108. In another, embodiment, a default initial ATC message communications protocol and/or CPDLC system is selected, e.g. depending on the location (for example Europe versus the U.S.) of the aircraft 101 obtained from a GNSS receiver that is part of the at least one sensor 110. In a further embodiment, the default initial ATC message communications protocol and/or CPDLC system is pre-determined by, and stored in, e.g. the communications protocol control application system 128.

In one embodiment, receipt of a selection of one of two or more communications protocols and/or CPDLC systems is possible. However, the selection of one of two communications protocols will be exemplified. In another embodiment, a first communications protocol is ACARS. In a further embodiment, a second communications protocol is ATN/OSI. In yet another embodiment, the second or third communications protocol is ATN/IP.

In block 232 determine if the second communications protocol has been selected. In one embodiment, determining if a second communications protocol has been selected includes determining if a CPDLC system using the second communications protocol has been selected. If the second communications protocol has not been selected, then in one embodiment, then proceed to block 234. If the second communications protocol has been selected, then in one embodiment, in block 238, enable the ability to send and receive messages in the second communications protocol, e.g. by enabling the second datalink applications system 126 including the second ATC datalink application sub-system 126A.

In block 240, trap any received and to be sent ATC messages 111 encoded with the first communications protocol, e.g. any FANS 1/A ATC messages. In one embodiment, received ATC messages 111, encoded in the first communications protocol, are received from an ATC 107 and delivered to the communications management system 104. In another embodiment, ATC messages 111, encoded in the first communications protocol, originate in the flight management system 102 (e.g. the first ATC datalink application sub-system 122A) and are transferred to the communications management system 104 to be relayed onwards. In a further embodiment, the communications protocol control application system 128 traps such ATC messages 111 which are encoded with the first communications protocol. Trapping means that the ATC messages 111 using the first communications protocol are not delivered to their intended destination, e.g. a component of the aircraft 101 or the ATC which are for example parts of FANS 1/A systems. In yet another embodiment, the trapped messages are acknowledged as being received, e.g. by the communications protocol control application system 128 to the message source such as the FMS 102, ATC 107, or AiOC 109; this prevents those systems from consuming bandwidth by continually repeating the same message and awaiting a confirmation receipt.

In one embodiment, if an ATC message 111 is trapped, a datalink is disconnected between the first ATC datalink application sub-system 122A employing the first communications protocol, e.g. the FANS 1/A system, in the vehicle 101, and a communications system, e.g. a FANS 1/A system, in an ATC 107 employing the first communications protocol. In a further embodiment, the datalink is disconnected by sending at least one disconnect message, e.g. from the communications protocol control application system 128 to the first ATC datalink application sub-system 122A and/or the communications system in the ATC 107.

In block 242, send and/or receive at least one ATC message 111 using the second communications protocol. Then, proceed to block 244.

In one embodiment, block 234, disable the ability to send and receive messages in the second communications protocol, e.g. by disabling the second datalink applications system 126 including the second ATC datalink application sub-system 126A. In block 236, send and/or receive at least one ATC message 111 using the first communications protocol. Then proceed to block 244.

In one embodiment, in block 244, send and/or receive at least one AOC/AAC message 113, e.g. respectively between the AOC datalink application sub-system of the selected datalink applications system and the AiOC 109. Thus, if the first datalink applications system, e.g. the FANS 1/A system, has been selected, the at least one AOC/AAC message 113 is sent and/or received using the first AOC datalink application sub-system 122B. Alternatively, if the second datalink applications system, e.g. the PM-CPDLC system, has been selected, the at least one AOC/AAC message 113 is sent and/or received using the second AOC datalink application sub-system 126B. In another embodiment, the at least AOC/AAC message 113 is sent and/or received using the first communications protocol, e.g. the ACARS protocol.

In one embodiment, in block 246, send and/or receive at least one ADS-C message, e.g. respectively from the ADS-C datalink application sub-system 122C and to the AiOC 109. In another embodiment, the ADS-C messages 115 are implemented in the first communications protocol, second communications protocol, or any other protocol. In a further embodiment, in block 248, receive another selection of another ATC message communications protocol and/or CPDLC system.

EXAMPLE EMBODIMENTS

Example 1 includes a method, comprising: receiving a selection of at least one of: an initial air traffic control (ATC) message communications protocol and an initial controller-pilot data link communications (CPDLC) system; determining if a second communications protocol was selected; if the second communications protocol was selected, trapping at least one of a received ATC message in a first communications protocol, and a to be sent ATC message in the first communications protocol; and at least one of sending an ATC message in the selected communications protocol and receiving an ATC message in the selected communications protocol.

Example 2 includes the method of Example 1, wherein receiving the selection of at least one of: the initial ATC message communications protocol and the initial controller-pilot data link communications (CPDLC) system comprises receiving a selection of one of a FANS 1/A CPDLC system and a protected mode CPDLC system.

Example 3 includes the method of any of Examples 1-2, wherein determining if the second communications protocol was selected comprises determining if at least one of: at least one of an ATN/OSI and an ATN/IP protocol was selected; and a PM-CPDLC system using at least one of the ATN/OSI and the ATN/IP protocol was selected.

Example 4 includes the method of Example 3, wherein trapping further comprises disconnecting a datalink using the first communications protocol.

Example 5 includes the method of Example 4, wherein disconnecting the datalink further comprises sending at least one disconnect message.

Example 6 includes the method of any of Examples 1-5 further comprising at least one of sending an ADS-C message, and receiving an ADS-C message.

Example 7 includes the method of any of Examples 1-6, further comprising if a first communications protocol was selected, then disabling ability to send and receive ATC messages in the second communications protocol.

Example 8 includes a system, comprising: a first system comprising: a first system processor; a first system memory coupled to the first management system processor, wherein the first system memory comprises: a navigation system; a first datalink applications system; and wherein the first datalink applications system is configured to encode and decode an Air Traffic Control (ATC) message using a first communications protocol; a second system, coupled to the first system, comprising: a second system processor; and a second system memory, coupled to the second system processor, comprising: at least one router; a second datalink applications system; a communications protocol control application system; wherein the second datalink applications system is configured to encode and decode an ATC message using a second communications protocol; wherein the communications protocol control application system is configured to: receive a selection of, or select, at least one of: an initial communications protocol, and a controller-pilot data link communications (CPDLC) system; determine if a second communications protocol was selected; and if the second communications protocol was selected, trapping at least one of a received ATC message in the first communications protocol and a to be sent ATC message in the first communications protocol; wherein the first system is configured to be coupled to at least one input/output device and at least one sensor; and wherein the second system is configured to be coupled to a communications system and at least one input/output device.

Example 9 includes the system of Example 8, wherein the communications management system further comprises a data processing system.

Example 10 includes the system of any of Examples 8-9, wherein the first datalink applications system comprises: a first air traffic control (ATC) datalink application sub-system; a first airline operations center (AOC) datalink application sub-system; wherein the first ATC datalink application sub-system is configured to encode and decode the ATC message using the first communications protocol; and wherein the first AOC datalink application sub-system is configured to encode and decode at least one of an airline operational message and an administrative control message.

Example 11 includes the system of Example 10, wherein trapping further comprises disconnecting a datalink using the first communications protocol:

Example 12 includes the system of Example 11, wherein disconnecting the datalink further comprises sending at least one disconnect message.

Example 13 includes the system of any of Examples 8-12, wherein the first datalink applications system comprises an automatic dependent surveillance-contract (ADC-C) sub-system.

Example 14 includes a program product comprising a non-transitory processor-readable medium on which program instructions are embodied, wherein the program instructions are operable to: receive a selection of at least one of: an initial air traffic control (ATC) message communications protocol and an initial controller-pilot data link communications (CPDLC) system; determine if a second communications protocol was selected; if the second communications protocol was selected, trap at least one of a received ATC message in a first communications protocol, and a to be sent ATC message in the first communications protocol; and at least one of send an ATC message in the selected communications protocol and receive an ATC message in the selected communications protocol.

Example 15 includes the program product of Example 14, wherein receive the selection of at least one of: the initial ATC message communications protocol and the initial controller-pilot data link communications (CPDLC) system comprises receive a selection of one of a FANS 1/A CPDLC system and a protected mode CPDLC system.

Example 16 includes the program product of any of Examples 14-15, wherein determine if the second communications protocol was selected comprises determine if at least one of: at least one of an ATN/OSI and an ATN/IP protocol was selected; and a PM-CPDLC system using at least one of the ATN/OSI and the ATN/IP protocol was selected.

Example 17 includes the program product of any of Examples 14-16, wherein trap further comprises disconnect a datalink using the first communications protocol.

Example 18 includes the program product of Example 17, wherein disconnect further comprises send at least one disconnect message.

Example 19 includes the program product of any of Example 14-18, further comprising at least one of send an ADS-C message, and receive an ADS-C message.

Example 20 includes the program product of any of Examples 14-19, further comprising if a first communications protocol was selected, then disable ability to send and receive ATC messages in the second communications protocol.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
receiving a selection of an air traffic control (ATC) message communications protocol based upon a selection of at least one of: the ATC message communications protocol and a controller-pilot data link communications (CPDLC) system, wherein each CPDLC system is configured to use either a first communications protocol or a second communications protocol;
determining if the second communications protocol was selected;
if the second communications protocol was determined to be selected, trapping at least one of a received ATC message in the first communications protocol, and an ATC message configured to be sent in the first communications protocol, wherein trapping the received ATC message or the to be sent ATC message encoded in the first communications protocol is performed without disconnecting a datalink using the first communications protocol; and
at least one of sending an ATC message in the selected ATC message communications protocol and receiving an ATC message in the selected ATC message communications protocol.

2. The method of claim 1, wherein receiving the selection of at least one of: the ATC message communications protocol and the second communications protocol of a controller-pilot data link communications (CPDLC) system comprises receiving a selection of one of a Future Air Navigation System 1/A (FANS 1/A) CPDLC system and a protected mode CPDLC system.

3. The method of claim 1, wherein determining if the second communications protocol was selected comprises determining if at least one of:
at least one of an Aeronautical Telecommunications Networks/Open Systems Interconnect (ATN/OSI) and an ATN/Internet Protocol (ATN/IP) protocol was selected; and
a protected mode-CPDLC (PM-CPDLC) system using at least one of the ATN/OSI and the ATN/IP protocol was selected.

4. The method of claim 1, wherein if an ATC message is trapped, then disconnecting a datalink using the first communications protocol.

5. The method of claim 4, wherein disconnecting the datalink further comprises sending at least one disconnect message.

6. The method of claim 1 further comprising at least one of sending an automatic dependent surveillance-contract (ADS-C) message, and receiving an ADS-C message.

7. A system, comprising:
a first system comprising:
a first system processor circuit;
a first system memory circuit coupled to the first system processor circuit,
wherein the first system memory circuit comprises:
a navigation system; and
a first datalink applications system;
wherein the first system is configured to encode and decode an Air Traffic Control (ATC) message using a first communications protocol;
a second system, coupled to the first system, comprising:
a second system processor circuit; and
a second system memory circuit, coupled to the second system processor circuit, comprising:
at least one router;
a second datalink applications system; and
a communications protocol control application system;
wherein the second system is configured to encode and decode an ATC message using a second communications protocol;
wherein the second system is further configured to:
receive a selection of an ATC message communications protocol based upon a selection of at least one of: the ATC message communications protocol, and a datalink applications system, wherein each datalink applications system is configured to use either the first communications protocol or the second communications protocol;
determine if the second communications protocol was selected; and
if the second communications protocol was determined to be selected, trapping at least one of a received ATC message in the first communications protocol and a to be sent ATC message in the first communications protocol, wherein trapping the received ATC message or the to be sent ATC message encoded in the first communications protocol is performed without disconnecting a datalink using the first communications protocol;
wherein the first system is configured to be coupled to at least one input/output device and at least one sensor; and
wherein the second system is configured to be coupled to a communications system and at least one input/output device.

8. The system of claim 7, wherein the second system further comprises a data processing system.

9. The system of claim 7, wherein the first datalink applications system comprises:
a first air traffic control (ATC) datalink application sub-system;
a first airline operations center (AOC) datalink application sub-system;
wherein the first system is further configured to encode and decode the ATC message using the first communications protocol, and
to encode and decode at least one of an airline operational message and an administrative control message.

10. The system of claim 9, wherein if an ATC message is trapped, then disconnect a datalink using the first communications protocol.

11. The system of claim 10, wherein disconnect the datalink further comprises sending at least one disconnect message.

12. The system of claim 7, wherein the first datalink applications system comprises an automatic dependent surveillance-contract (ADS-C) subsystem.

13. A program product comprising a non-transitory processor-readable medium on which program instructions, configured to be executed by a programmable processor, are embodied, wherein the program instructions are operable to:
receive a selection of an air traffic control (ATC) message communications protocol based upon a selection of at least one of: the ATC message communications protocol and a controller-pilot data link communications (CPDLC) system, wherein each CPDLC system is configured to either a first communications protocol or a second communications protocol;
determine if the second communications protocol was selected;
if the second communications protocol was determined to be selected, trap at least one of a received ATC message in the first communications protocol, and an ATC message configured to be sent in the first communications protocol, wherein trapping the received ATC message or the to be sent ATC message encoded in the first communications protocol is performed without disconnecting a datalink using the first communications protocol; and
at least one of send an ATC message in the selected ATC message communications protocol and receive an ATC message in the selected ATC message communications protocol.

14. The program product of claim 13, wherein receive the selection of at least one of: the ATC message communications protocol and the second communications protocol of a CPDLC system comprises receive a selection of one of a Future Air Navigation System 1/A (FANS 1/A) CPDLC system and a protected mode CPDLC system.

15. The program product of claim 13, wherein determine if the second communications protocol was selected comprises determine if at least one of:
at least one of an Aeronautical Telecommunications Networks/Open Systems Interconnect (ATN/OSI) and an ATN/Internet Protocol (ATN/IP) protocol was selected; and
a protected mode-CPDLC (PM-CPDLC) system using at least one of the ATN/OSI and the ATN/IP protocol was selected.

16. The program product of claim 13, wherein the program instructions are further operable to, if an ATC message is trapped, disconnect datalink using the first communications protocol.

17. The program product of claim 16, wherein disconnect the datalink further comprises send at least one disconnect message.

18. The program product of claim 13, wherein the program instructions are further operable to at least one of send an automatic dependent surveillance-contract (ADS-C), and receive an ADS-C message.

\* \* \* \* \*